UNITED STATES PATENT OFFICE.

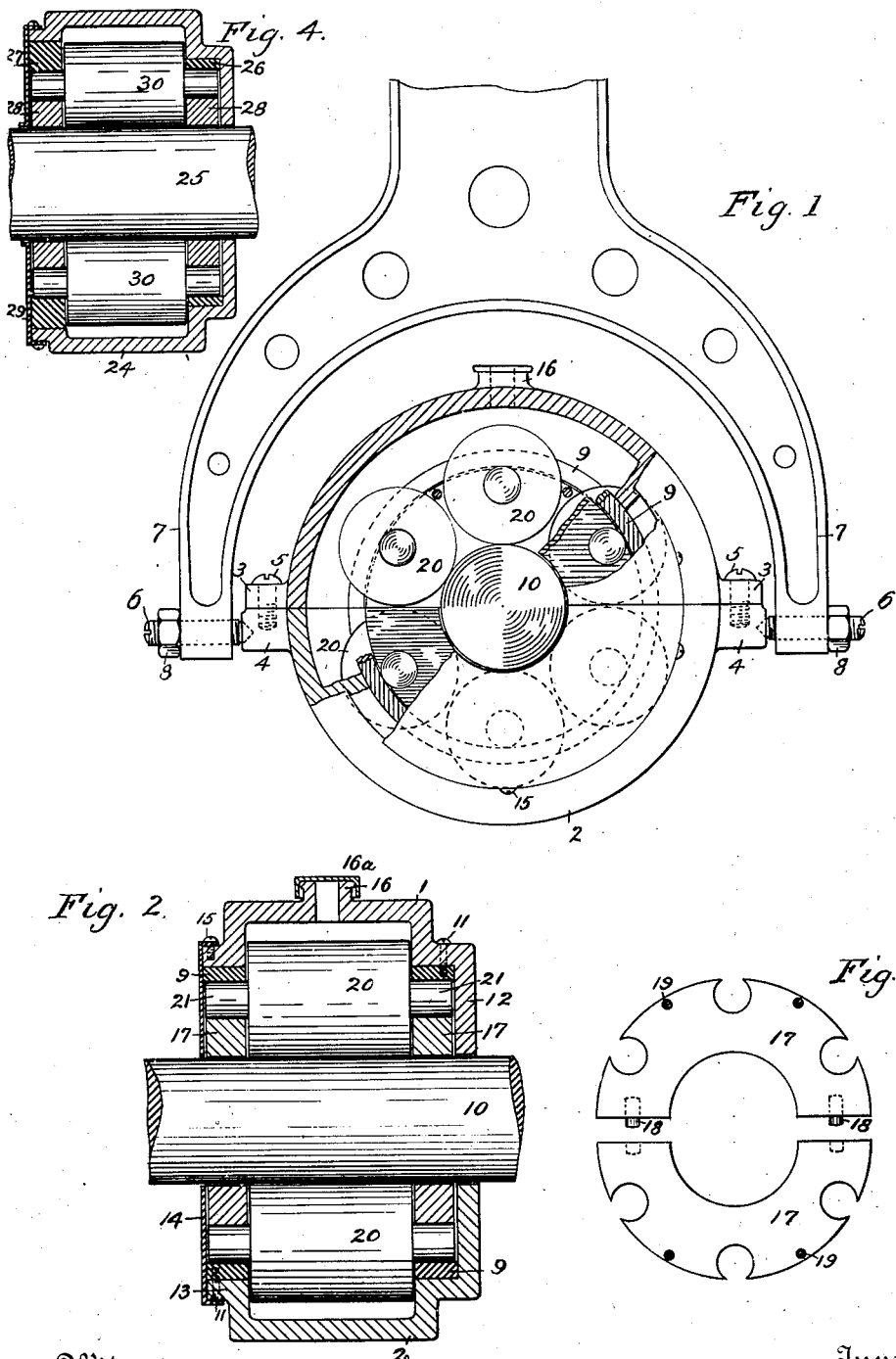
W. J. BREWER.
ROLLER BEARING.
APPLICATION FILED MAR. 26, 1909.
955,128. Patented Apr. 19, 1910.

WILLIAM J. BREWER, OF BROOKLYN, NEW YORK, ASSIGNOR TO NEW YORK OILLESS BEARING CO., OF NEW YORK, N. Y., A CORPORATION OF NEW YORK.

ROLLER-BEARING.

955,128.  Specification of Letters Patent.  Patented Apr. 19, 1910.

Application filed March 26, 1909. Serial No. 485,889.

*To all whom it may concern:*

Be it known that I, WILLIAM J. BREWER, a subject of the King of Great Britain, and resident of Brooklyn, in the county of Kings and State of New York, have invented certain new and useful Improvements in Roller-Bearings, of which the following is a specification.

The invention relates to improvements in roller-bearings and in general construction is adaptable to truck-wheels rotatable upon a fixed axle and for hanger-boxes for supporting a rotating shaft.

The object of the invention includes certain details of construction whereby the several parts are securely retained in adjustment and held in conveniently detachable relation with one another to provide an efficient and durable bearing.

In describing the invention in detail reference is had to the accompanying drawings, forming part of this specification, and wherein like characters of reference are used to designate like parts throughout the several views, and in which:

Figure 1 is an end view of a roller-bearing embodying the present invention and shown in connection with a portion of a hanger or supporting-frame, the wall of the bearing being broken away to show the interior arrangement of parts; Fig. 2, a longitudinal vertical section of the same; Fig. 3, a detail side view of the retainer for the rollers; and Fig. 4 is a longitudinal section of a modification of the bearing in its adaptation to a wheel rotatable upon a fixed axle.

In the drawings, numerals 1 and 2 designate respectively the upper and lower half-box or casing of the bearing, provided with side connection-lugs 3 and 4, and detachably connected together by screws 5. The connection-lugs 4 of the lower half-box is of sufficient size and strength to receive the pointed ends of the supporting-screws 6, the latter engaging screw-threaded perforations in the hanger-arms 7 and adjustably secured therein by the lock-nuts 8. With the side walls of the box or casing are formed ledges for receiving the annular bearing-surfaces or wearing-sleeves 9, concentrically disposed with relation to the central shaft 10, and detachably secured in place by screws 11 for convenient renewal in case of wear. The side wall 12 is formed integral with the box and extends inwardly to loosely embrace the shaft 10, and the opposite side wall is provided with an outwardly-extending flange 13 to receive the detachable side cover-plate 14, which latter is made in halves, formed with an inwardly-extending flange to engage the flange 13 of the box, and removably secured thereto with screws 15. A boss 16 is formed upon the upper half-box and provided with a feeding-orifice for supplying suitable lubricant to the interior of the bearing, a detachable cap 16ª closing said orifice.

Within the box is rotatably mounted a two-part retainer or spider 17, comprising a pair of rings longitudinally and centrally divided with respect to the shaft and provided at the joints with alining or dowel pins 18. The rings are spaced apart to aline with the bearing-surfaces 9 and are connected together laterally with cross-ties 19 to form a cage for retaining the rollers 20 in proper spaced relation with one another, the rollers being provided with laterally-extending journal-ends 21, which are rotatably supported in bearings suitably disposed in the retainer-rings to permit of the projection of said journal-ends beyond the peripheries of the rings. The rollers are held in the retaining-rings against displacement by the contracted peripheral opening of the bearings, said bearings loosely engaging the journal-ends of the rollers and permitting the latter to transfer the working load between the shaft 10 and the bearing-surfaces 9, which in operation causes a relatively slow rolling contact between the latter and the journals of the rollers and also a slow rotation of the retainer within the box.

It will be readily seen that the separate halves of the box may be readily adjusted about the shaft without disturbing the position of the latter, and that the half-sections of the retainer may likewise be adjusted without displacing the rollers therein.

In Fig. 4 is shown a modification of the roller-bearing as applied to a wheel 24, having a continuous rim and arranged to rotate about a fixed axle 25, the annular bearing-surfaces 26 and 27 being continuous as are also the retainer-rings 28 and the cover-plate 29. The rollers 30 are mounted in the retainer-rings in the manner previously described, and the interior parts may be readily removed from the wheel or adjusted upon the shaft by the removal of the cover-plate 29 and the annular bearing-surface 27.

What I claim as my invention and desire to secure by Letters Patent, is:—

1. In a roller-bearing, the combination with an axle or shaft and a relatively-rotatable wheel or box provided with interior annular bearing ledges concentric with said shaft, of a retainer rotatably mounted in said wheel or box and comprising a pair of rings spaced apart in alinement with said bearing-ledges and connected together with cross-ties, said retainer-rings being provided with journal-bearings having restricted openings cutting the peripheries of said rings, rollers mounted in the wheel or box and engaging the shaft, and laterally-extending journal-ends formed on the rollers and rotatably mounted in the journal-bearings of the retainer-rings for rolling engagement with the bearing-ledges of the wheel or box.

2. In a roller-bearing, the combination with an axle or shaft and a relatively-rotatable wheel or box provided with detachable interior annular bearing-ledges concentric with said shaft, of a retainer rotatably mounted in said wheel or box and comprising a pair of rings spaced apart in alinement with said bearing-ledges and connected together with cross-ties, said retainer-rings being provided with journal-bearings having restricted openings cutting the peripheries of said rings, rollers mounted in the wheel or box and engaging the shaft, and laterally-extending journal-ends formed on the rollers and rotatably mounted in the journal-bearings of the retainer-rings for rolling engagement with the bearing-ledges of the wheel or box.

3. In a roller-bearing, the combination with an axle or shaft and a relatively-rotatable wheel or box provided with interior annular bearing-ledges concentric with said shaft, a retainer rotatably mounted in said wheel or box and comprising a pair of rings spaced apart in alinement with said bearing-ledges and connected together with cross-ties, said retainer-rings being provided with journal-bearings having restricted openings cutting the peripheries of said rings, rollers mounted in the wheel or box and engaging the shaft, laterally-extending journal-ends formed on the rollers and rotatably mounted in the journal-bearings of the retainer-rings for rolling engagement with the bearing-ledges of the wheel or box, said box being provided on one side with an integral wall loosely embracing the shaft and upon the opposite side with a projecting flange, and a side cover plate detachably connected to said projecting flange.

Signed at New York city in the county of New York and State of New York this 24th day of March A. D. 1909.

WILLIAM J. BREWER.

Witnesses:
EDWARD TOTTEN,
M. ANGELO ELIAS.